C. B. HATFIELD, Jr.
AUTOMOBILE DRIVING MECHANISM.
APPLICATION FILED AUG. 3, 1908.
943,745.
Patented Dec. 21, 1909.
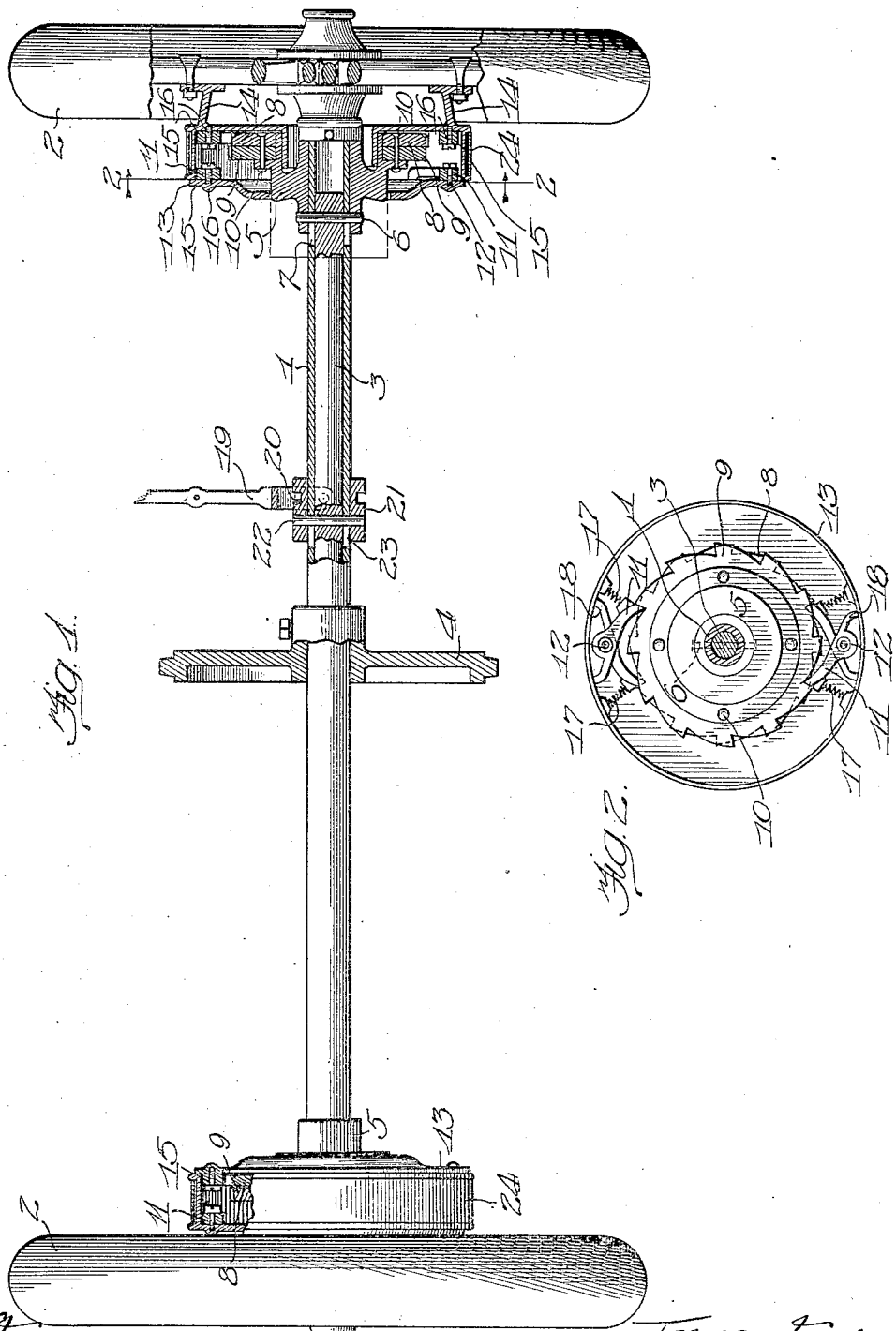

UNITED STATES PATENT OFFICE.

CHARLES B. HATFIELD, JR., OF OSHKOSH, WISCONSIN.

AUTOMOBILE DRIVING MECHANISM.

943,745.  Specification of Letters Patent. Patented Dec. 21, 1909.

Application filed August 3, 1908. Serial No. 446,699.

*To all whom it may concern:*

Be it known that I, CHARLES B. HATFIELD, Jr., a citizen of the United States, residing at Oshkosh, Winnebago county, Wisconsin, have invented certain new and useful Improvements in Automobile Driving Mechanism, of which the following is a specification.

My invention relates to driving mechanism for self-propelled vehicles, such as automobiles and the like, and the object thereof is to provide a novel, simple and efficient mechanism of this character capable not only of serving as driving mechanism but also as a differential. Inasmuch as my driving mechanism performs differential functions, the ordinary differential composed of gear wheels may be entirely dispensed with and the mechanism of the vehicle thereby considerably simplified. Speaking in general terms, I provide a live driving shaft or axle made in one piece, as compared with the divided axle where a differential is employed, and operatively connect such axle with the driving wheels of the vehicle by pawl and ratchet driving connections or their equivalent, which are so constructed and arranged that the vehicle may be caused to travel forward or backward as desired according to whichever sets of pawl and ratchet connections are in engagement.

Other features of advantage and utility in my new construction of driving mechanism will be apparent from the description hereinafter given.

In the drawing, Figure 1 is an elevation partly in section of the driving axle and loosely mounted driving wheels of a self-propelled vehicle, such as an automobile, the right-hand side of the view being shown in section to illustrate the pawl and ratchet driving connections; and Fig. 2 a sectional elevation on the line 2—2 of Fig. 1 looking in the direction of the arrows.

Referring to the present embodiment of my invention as illustrated in the drawing, wherein the same is shown in connection with an automobile structure, I provide a hollow live driving shaft or axle 1 which in the present instance is tubular. This live axle carries at its ends the usual driving road wheels 2 which are mounted to rotate thereon and such axle surrounds a rod or shaft 3 which may be solid or hollow as desired, but capable of a longitudinal movement in relation to the axle, as hereinafter explained. The axle may be operatively connected with the prime mover (such as a gasolene or steam engine) in any suitable manner, but in the present instance I have shown a driving sprocket wheel 4 secured to the axle, it being understood that this sprocket wheel forms a member of a train of driving connections connected with the engine or other motor.

Each end of the axle is provided with the combined power-transmitting mechanism and differential ratchet device, which are similar except as to the reversal of the pawls and ratchets as hereinafter explained. I will therefore proceed to describe the driving connections shown in section at the right-hand end of Fig. 1, the other driving connections being the same with the exception noted.

The axle is provided near each end and just inside the wheels with a ratchet carrier or support 5 which, in general, is of circular form and provided with a central hub encompassing the axle and secured thereto and also to the shaft 3 in any suitable manner. In the present instance said parts are secured together and provision at the same time made for shifting said ratchet carrier by a transverse pin 6 which passes through said hub and also through the axle 1 and the shaft 3, said axle being provided with longitudinal slots 7 to permit of the movement of the shaft 3 and the ratchet carrier 5 independent of the axle. This carrier is provided at one side of its periphery with a pair of ratchets 8 and 9 which are in the form of rings with their ratchet teeth reversely arranged one with respect to the other. These ratchets or rings are arranged not only in parallel planes but in juxtaposition, the same being secured to each other and also to their carrier in any suitable manner, as by means of the rivets 10.

Each ratchet or ring has its own pawls and provision is made whereby only one ratchet is active at a time, the other ratchet being inactive, that is out of engagement with its pawls, but provision is further made whereby said driving connections may be shifted so as to bring the other ratchet into active condition. As herein shown the ratchet 9 coöperates with the pawls 11 which, by preference, are two in number, although even a single pawl might be employed. These pawls are pivoted upon pins 12 to the inner face of a pawl carrier or support 13 which is secured in any suitable manner to the adjacent driving wheel 2 of the vehicle as by means of brackets 14 or the like. The ratchet 8 is provided with similar pawls 15 pivoted upon pins 16 to the opposite inner surface of said casing. While these pawls are arranged in parallel planes, they are separated, with the result that when the ratchets are in the relative position illustrated in Fig. 1 the ratchet 8 is the active one, being then in coöperative relationship with its pawls while the ratchet 9 is the inactive one, being then in a plane between the planes occupied by the two sets of pawls. However, when the shaft 3 is shifted longitudinally of the axle one ratchet carrier and its ratchets at one end of the shaft are moved inwardly, that is toward the center point of such axle, and the other ratchet is moved outwardly, thereby disconnecting the ratchets 8 from their pawls and rendering the same inactive and connecting the other ratchets 9 with their pawls and rendering them active. When now the sprocket wheel 4 is rotated in the reverse direction, the direction of movement of the vehicle is reversed. Assuming that when the parts are in the relative position shown in Fig. 1 the direction of the vehicle is forward, a shifting of the parts as described and a reversal of rotation of the sprocket wheel 4 will cause a backward movement of the vehicle.

The pawls are spring-pressed inwardly toward their ratchets by means of the spring 17 and to prevent such ratchets from being pressed so far inwardly as to prevent said shifting movement of the ratchets and to always secure side register between the pawls and the ratchets therewith, such pawls are provided with extensions 18 which serve as stops inasmuch as the extreme ends of the same are adapted to contact the inner surface of the casing 13.

The shaft 3 may be shifted longitudinally of the axle in any suitable manner, but in the present instance I have shown a pivoted shifter arm or lever 19 which has a portion adapted to engage a groove 20 in a sleeve upon the axle. This sleeve is secured to the shaft 3 by means of the transverse pin 22, the axle being slotted at 23 to accommodate the pin in its movements. By preference the casing 13 is made in the form of a drum in order to act as a brake drum in connection with the brake band 24, but this feature is not herein broadly claimed but is so claimed in my separate but simultaneously filed application for patent Serial No. 446,698.

When the vehicle is running straight ahead or backward the driving is done by the ratchets and their pawls at opposite ends of the axle, but when the vehicle is turning a curve the driving is done by the inside road wheel, which is the slower moving wheel and, inasmuch as the outer road wheel, which is moving on the greater radius, is moving the faster, the same will be permitted to so move inasmuch as the pawls will at such time simply slip over their ratchets. My construction and arrangement of mechanism is not only a simple and efficient device as a power-transmitting mechanism but also a combined power-transmitting or driving mechanism and a differential, inasmuch as it has the differential function as above stated. Furthermore, the device may be considered a combined differential and brake when the casing serves as a brake drum. Moreover, my construction permits of a live axle made in one piece instead of the usual form of divided axle. As hereinbefore stated, the particular means for driving the live axle is not material so far as my invention is concerned and that consequently I am not to be limited herein to the employment of any driving mechanism requiring the use of a sprocket wheel such as the wheel 4.

After the foregoing description of my invention, it is obvious that the ratchet wheels and their respective pawls are reversed on the left-hand side of the structure shown in Fig. 1, so that the proper sets of ratchet wheels and pawls for driving the vehicle forward or backward as the case may be will be in proper coöperative relationship. While I prefer to employ ratchets and pawls as my self-acting driving connections, yet the equivalents thereof may be employed and I contemplate so doing.

I claim:

1. In a driving mechanism for a self-propelled vehicle, the combination, with the driving road wheels of such a vehicle, of a live axle on which the wheels are mounted to rotate, a ratchet carrier at each end of the axle and secured directly thereto, a pair of reversely acting ratchets secured to each carrier, pawls for said ratchets, a pawl carrier or support secured to each vehicle wheel, and means for shifting the ratchet carrier longitudinally of the axle for disconnecting one set of ratchets and pawls and connecting another set thereof at each end of the axle; said ratchets and pawls performing both driving and differential functions; substantially as described.

2. In a driving mechanism for a self-propelled vehicle, the combination, with the driving road wheels of such a vehicle, of a live axle on which the wheels are mounted to rotate, a ratchet carrier at each end of the axle and having a central hub portion fitting upon the axle and secured thereto for rotary movement therewith and also for independent longitudinal movement in respect thereto, ratchets secured to each carrier, a pawl carrier secured to each vehicle wheel, separate pawls arranged on said pawl carrier and adapted to coöperate with the ratchets, and means for shifting the ratchet carrier longitudinally of the axle for disconnecting one set of ratchets and pawls and connecting another set thereof at each end of the axle for driving forwardly or backwardly as the case may be; substantially as described.

3. In a driving mechanism for a self-propelled vehicle, the combination, with the driving road wheels of such a vehicle, of a live axle on which the wheels are mounted to rotate, a ratchet carrier at each end of the axle and having a central hub portion fitting upon the axle and secured thereto for rotary movement therewith and also for independent longitudinal movement in respect thereto, ratchets secured to each carrier and arranged in parallel planes but in juxtaposition, a pawl carrier secured to each vehicle wheel, separate pawls arranged on said pawl carrier and adapted to coöperate with the ratchets, and means for shifting the ratchet carriers longitudinally of the axle for disconnecting one set of ratchets and pawls and connecting another set thereof at each end of the axle for driving forwardly or backwardly as the case may be; substantially as described.

4. In a driving mechanism for a self-propelled vehicle, the combination, with the driving road wheels of such a vehicle, of a live axle on which the wheels are mounted to rotate, a ratchet carrier at each end of the axle and having a central hub portion fitting upon the axle and secured thereto for rotary movement therewith and also for independent longitudinal movement in respect thereto, ratchets secured to each carrier and arranged in parallel planes but in juxtaposition, a pawl carrier secured to each vehicle wheel, separate pawls arranged on said pawl carrier and adapted to coöperate with the ratchets, and means for shifting the ratchet carriers longitudinally of the axle for disconnecting one set of ratchets and pawls and connecting another set thereof at each end of the axle at the will of the operator, said pawl carriers being formed as casings for inclosing the pawls and ratchets and for also serving as a brake drum; substantially as described.

CHARLES B. HATFIELD, Jr.

Witnesses:
 R. A. HOLLISTER,
 H. I. WEED.